P. M. STEPHAN.
FULL CIRCLE COLLAPSIBLE RETREAD MOLD.
APPLICATION FILED JULY 19, 1918.
1,307,798.
Patented June 24, 1919.
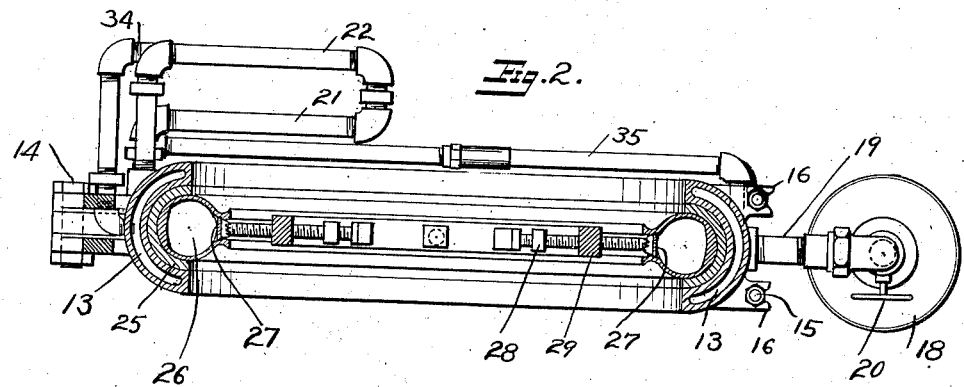
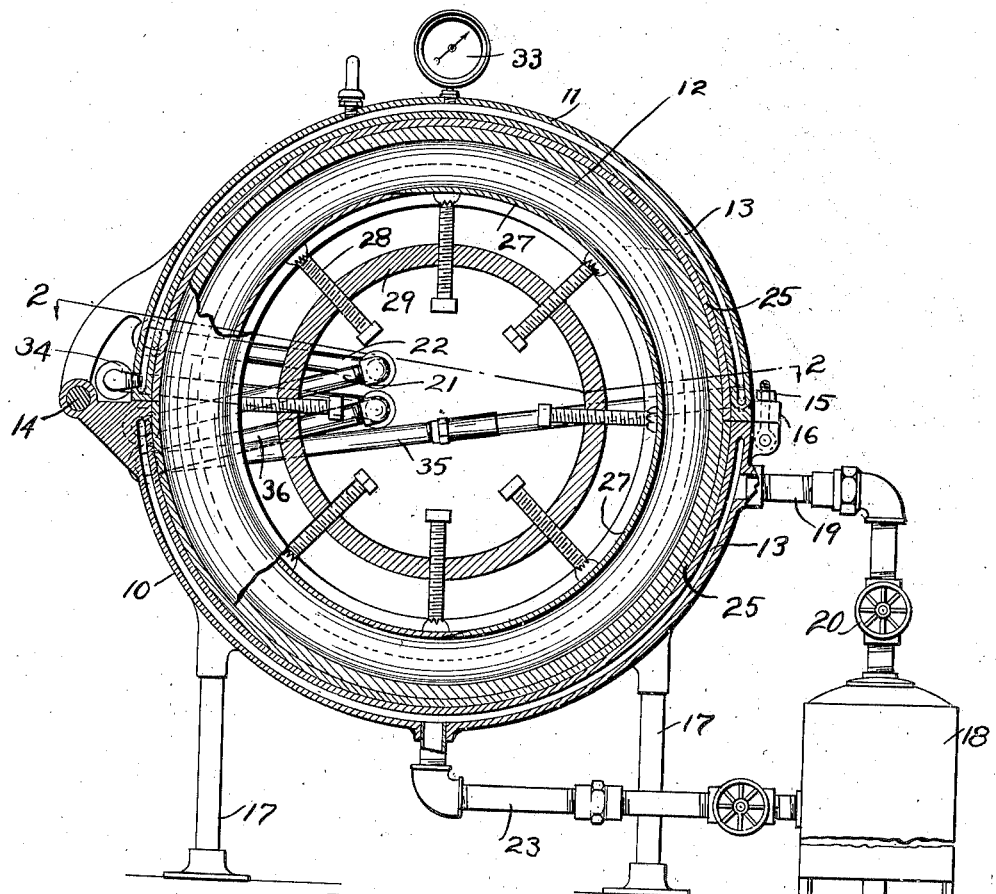
Inventor
Paul Max Stephan
By Strong & Townsend
Attorneys.

UNITED STATES PATENT OFFICE.

PAUL MAX STEPHAN, OF SAN FRANCISCO, CALIFORNIA.

FULL-CIRCLE COLLAPSIBLE RETREAD-MOLD.

1,307,798. Specification of Letters Patent. Patented June 24, 1919.

Application filed July 19, 1918. Serial No. 245,620.

*To all whom it may concern:*

Be it known that I, PAUL MAX STEPHAN, a citizen of the United States, residing at the city and county of San Francisco and State of California, have invented new and useful Improvements in Full-Circle Collapsible Retread-Molds, of which the following is a specification.

This invention relates to a retread mold for use in connection with pneumatic tires.

It is the custom at the present time to remodel pneumatic vehicle tire casings when they have become worn, and to supply them with a new tread. This operation has been accomplished by curing layers of rubber, applied to the tread in molds representing a segment of the tire circumference. This has resulted in producing soft spots in the retread, as well as requiring considerable time and skill in the operation.

It is the principal object of this invention to provide a retread mold within which several tires of different sectional sizes and diameters may be treated, and which will insure a continuous retread at one operation, thus insuring a tread of uniform texture, which is made in a fraction of the time required by most other methods.

The present invention contemplates the use of an annular retread mold formed of complementary halves adapted to encompass a complete tire casing, and to cure said casing at one operation. This structure further embodies means for clamping the tire in place, and for holding a sand or air bag within the casing to insure that the wall will be thoroughly permeated with heat and uniformly treated.

The invention is illustrated by way of example in the accompanying drawings, in which—

Figure 1 is a view in vertical section as seen through the complete curing mold, and further disclosing the clamping apparatus holding a tire within the mold.

Fig. 2 is a view in section as seen on line 2—2, Fig. 1, illustrating the clamping device and the curing mold.

Referring more particularly to the drawings, 10 and 11 indicate the separate halves of the curing mold. These halves are complementary and when combined as shown in Fig. 1 form a complete encircling jacket for the pneumatic tire 12. Each of the mold members are formed with a double wall to provide an intervening steam circulating passageway 13. At one side of the device the mold members are formed with hinge brackets, which are pivotally united by a hinge pin 14. The opposite or free ends of the molds are adapted to be locked together by locking bolts 15 swiveled to the lower mold 11, and provided to swing into engagement with lugs 16 upon the edge of the upper mold. In the present instance the lower mold is rigidly held upon standards 17, although other fixtures might be used. The two circulating passageways 13 of the mold sections are in communication with the steam generator 18 by means of a connecting conduit 19. This member is fitted with a control valve 20. The conduit 19 supplies steam to the circulating passageway in the lower casing member. Pipes 21 and 22 are provided to conduct the steam from the lower circulating passageway and the upper also. These pipes have a swivel joint as shown in Fig. 2, and thus the mold halves may be swung in relation to each other without interrupting the supply of steam thereto. A return of the condensed steam may be effected through a drain pipe 23 leading from the lowermost portion of the circulating passageway 13 in the lower mold half. The upper half of the mold is drained by a pipe 34 which communicates with the steam jacket near the hinge and a pipe 35 communicating with the opposite end of the steam jacket on this upper half. The pipe 34 is secured by a swivel joint to a drain pipe 36 which empties into the lower steam jacket. This pipe is also in communication with the pipe 35. By this arrangement the two intercommunicating pipes between the separate mold parts may yield to allow the mold to be opened. It is highly desirable that tires of various diameters be treated with a single mold. This is especially true in view of the fact that a tire stretches in use, and may be from 10 to 20% larger in diameter than its original dimension.

The present device has been designed to accommodate certain groups of tires, as for instance, tires measuring 31"x4", 30"x3½" and 30"x3". These three sizes are accommodated by the use of a shell 25 which fits within the crescent shaped annular recess of the curing mold. It will be understood that the curing mold is semi-circular in section as shown in Fig. 2, and that a recess corresponding to the outer contour of a tire is thus formed. By the use of rings of a different contour the casing treated may be firmly interposed, and, at the same time, rigidly mounted within the curing mold.

It is a common practice to fit the casing with an air bag or sand bag 26. This bag is positioned within the casing, and takes the place of the pneumatic tube normally inclosed thereby. A clamping ring 27 extends around within the casing, and bears against the inner circumference of the sandbag. This ring is fitted with a series of clamping bolts 28, which extend through threaded openings in a pressure ring 29. The bolts extend radially, and when tightened will securely hold the outer wall of the casing against the inner circumference of the shell 25.

In operation a casing is properly prepared for retreading, after which a suitable layer of rubber is applied to the tread portion thereof. When this is in proper condition the casing is positioned within the shell 25, and thereafter inclosed by the curing mold comprising the halves 10 and 11. A sand bag is placed within the casing and the clamping ring 27 positioned thereagainst. This ring may be split in one or more places to allow it to freely expand. When the ring is in place it may be rigidly clamped against the sand bag by the set screws 28. The power exerted by these screws will hold the casing rigidly. Steam may then be admitted through the pipe 19, and will circulate through the chamber 13 of the lower casing member through pipes 21 and 22 and a similar chamber in the upper casing member.

A gage 30 may be used to indicate the pressure of the steam within the mold. This pressure may be maintained until the mold is thoroughly heated, and will thereafter impart the heat to the tread. Continuous application of this heat will cure the retread portion and render the tire suitable for further use.

Attention is directed to the fact that treads of different designs may be produced and cured, and that by the arrangement here shown the exact area upon the tread may be treated without damaging the rubber adjacent thereto.

It will thus be observed that by the use of the present device a full circle curing action may be provided to produce a retread of uniform density and thickness in a rapid manner.

Having thus described my invention, what I claim and desire to secure by Letters Patent is:

1. In a retread mold, a pair of superimposed tire encircling members each of semi-circular form, said members being hinged together at one of their ends and being arranged vertically so that their ends meet in a horizontal plane, each member having a semi-circular chamber therein, a steam supply pipe leading from one end of the chamber of the lower member to the adjacent end of the chamber of the upper member, a drain pipe leading from said end of the chamber of the upper member to said end of the chamber of the lower member, a drain pipe leading downwardly from the other end of the chamber of the upper member into said first-named drain pipe, and a drain pipe extending into the chamber of the lower member at the lowest point of the chamber.

2. A retread mold including a pair of hinged tire encircling members, means to supply heat to the members, a pressure ring arranged within the members, a sectional ring interposed between the pressure ring and the tire encircling members, and radial set screws extending through the pressure ring and engaging the respective sections of the sectional ring so as to effect adjustment of the latter.

3. A retread mold including a pair of hinged tire encircling members, means to supply heat to the members, a pressure ring arranged within the members, a sectional ring interposed between the pressure ring and the tire encircling members, and independent operable means between the pressure ring and the sections to allow of variable adjustments of the latter.

In testimony whereof I have hereunto set my hand in the presence of a subscribing witness.

PAUL MAX STEPHAN.

Witness:
W. W. HEALEY.